Patented Feb. 1, 1938

2,106,784

UNITED STATES PATENT OFFICE 2,106,784

MANUFACTURE OF YEAST

John F. Wroten, Baltimore, Md.

No Drawing. Application July 20, 1933,
Serial No. 681,273

11 Claims. (Cl. 195—90)

This invention relates to improvements in the manufacture of bakers' yeast by propagating it in a nutrient medium containing along with other ingredients yeast assimilable sugars. Among the desiderata of a process of this character is the provision of a nutrient medium, including sugars, upon which the yeast may feed and multiply rapidly while at the same time the conversion of sugars to alcohol in such quantities and concentration that the yield of yeast is poor, is avoided. In addition, there are other varied and more or less conflicting requirements which intimately affect the successful operation of the process, such as the presence in the medium of yeast assimilable nitrogenous material and salts of potassium and phosphorus, the temperature under which the propagation is conducted, the simplicity of control of the process, the apparatus required, and so on, and certain of these requirements have not been met by previous attempts to overcome the strong, inherent tendency toward the formation of alcohol during the process.

In accordance with the present invention, I provide for the manufacture of yeast by means of a process which not only satisfies these requirements in a superior manner but also avoids in large measure the disadvantages of prior processes; is reasonably inexpensive; enables a good control of the conditions of the process in a simple and expeditious manner; and results in the rapid production of a good yield of high-grade yeast. More particularly, I have found that it is possible to propagate yeast in a fermenter and simultaneously to convert starchy materials into fermentable sugars, by means of an enzyme, in the presence of the mass in the fermenter and under conditions suitable to the rapid growth of a high yield of good yeast.

The process may be carried out by preliminarily converting starches to a soluble condition, commencing the propagation of yeast in a wort or medium of suitable Balling containing at least a portion of the starches and other ingredients on which yeast feeds, adding to the mass an enzyme adapted to convert the starches to sugars, and conducting the propagation at a proper temperature, while withholding from the mass a portion of the starches or the enzymes, or both, and adding the withheld portion to the mass in such quantities and over such periods of time that the sugars formed during a given period may be substantially assimilated by the yeast grown during such period. Fractions of the portion so withheld may be added to the mass in the fermenter from time to time, for instance, in equal amounts or in successively increasing amounts, in accordance with the principle disclosed in my Patent No. 1,917,283, granted July 11, 1933. However, while my process involves particular advantages where carried out in this manner, in its broadest aspects it is not restricted to a particular way of adding the starches or enzymes, as the additions to the mass might even be made in a substantially continuous fashion, if desired.

By way of a specific example, I may take a quantity of starch or starchy materials and initially treat the same to convert the starch to a liquefied or soluble condition, without the formation of substantial or large amounts of sugars. This may be accomplished, for instance, by the use of a suitable enzyme, preferably of the type present in malt, in the following manner. 1000 pounds of starch may first be mixed with 150 gallons of cold water to make a paste, and this paste may be added to, say, 1600 gallons of boiling water and boiled for fifteen minutes or so, after which the mixture may be cooled to about 75° C., whereupon a suitable quantity of malt extract, for instance, of the character indicated below, may be rapidly added to the mixture, which may be agitated for about five minutes, and then raised to the boiling point, for say, five to ten minutes. The mixture is then preferably cooled or allowed to cool before being employed as hereafter pointed out. In this way, the starch may be hydrated, swelled and ruptured, during the initial boiling, and then liquefied or rendered soluble by the enzyme in the malt extract or in any other possible manner. At the same time, little or no starch is converted to sugar.

The extract for liquefying the starch may be obtained from malt by leeching it with water, at around 50° C. for two hours, more or less. Where 1000 pounds of starch are employed, 20 pounds of malt may be treated in the manner indicated with 100 gallons of water, and the resulting extract may be added to the starch at the point above indicated. While malt extract thus prepared is in a particularly advantageous condition for solubilizing the starch or converting it to a liquefied condition, the process is not limited to any particular manner of making a solution.

The liquefied starch solution may be run directly into the fermenter containing all or part of any suitable other ingredients required to furnish a nutrient medium for the growth of yeast. Such ingredients may include nitrogenous materials from any convenient source, such as sprouts, and potash and phosphorus in suitable form for digestion by the yeast. Some sugars may be present in the initial stages of the reaction in the fermenter but preferably not more than can be consumed by the yeast during these stages. That is to say, if some small amount of sugar is formed during the preparation of the starches, such sugar may not be objectionable in the initial nutrient medium in the fermenter. Those skilled in the art will readily understand the relative proportions of sugars, nitrogenous materials, and salts, particularly of potassium and phosphorus, to be employed for the nutrient medium. However, by way of example, the mass in the fermenter may include 1000 pounds of starch, 1200 pounds of malt sprouts, and additional nitrogenous materials from any suitable source, if desired, as well as other ingredients required to make a mash adapted for proper growth of yeast.

The volume in the fermenter may be adjusted to a suitable initial Balling, for instance, approximately 4.5, and after the mass has cooled to about 32° C. it may be stocked with seed yeast sufficient to initiate propagation. The mass in the fermenter may then be aerated for about two to three hours, or for a time sufficient to permit the growing yeast to assimilate whatever sugars are present in the fermenter. Thereafter, diastase or malt extract of the character above indicated, or other satisfactory enzyme, may be added to the mass in such proportions and at such times as to convert only that amount of starch to maltose or other fermentable sugar as is required for the growth of yeast so that little or no alcohol is formed. In other words, the process is preferably carried out so as to limit the rate of conversion of starch to sugars to that rate at which no substantial excess of sugar is present at any given time over what is required by the yeast for food. For instance, a suitable amount of the malt extract may be added to the mass in the fermenter at the end of the second, seventh and tenth hours during which the propagation is carried on, about one-third of the total malt extract being added at each of these times. However, it is not desired to restrict the invention to these particular proportions or times mentioned. The total malt extract which may be added during the fermentation may be an extract prepared as above described from, say, about 10 pounds of malt and 50 gallons of water. It will be appreciated that equivalent quantities of other enzymes might be employed in place of the malt extract. While the sprout extract and other ingredients of the mass in the fermenter, in addition to the starches, may be added at the outset, advantages are secured by adding the sprout extract at one or more times after the initiation of the propagation of yeast. For example, good results may be secured where 60% of the sprout extract is added at the end of the second hour to the mass in the fermenter, while the other 40% of the sprout extract is added at the end of the seventh hour. Fermentation or propagation may be continued at a temperature proper for the propagation of yeast, for instance, 30–32° C., for twelve to thirteen hours or until the propagation is completed.

I have found that through the present process the sugar is assimilated by the yeast substantially as rapidly as formed and affords practically no excess of sugar for the production of alcohol. At the same time, this present method produces an excellent yield, over 200, and even as much as 250 parts by weight of yeast being possible of production, for each 100 parts by weight of total sugars employed. Moreover, the yeast produced is of a high-grade, uniform quality. In addition to these advantages, the process is extremely simple to carry out and may be readily controlled, and completed in a reasonably short period of time. The raw materials employed are not excessively expensive, the equipment required is simple to build, a single fermenter being sufficient, and a large amount of yeast may be made in a relatively small fermenter.

The propagation of yeast may also be carried out by adding all the diastase to the fermenter initially, and then adding liquefied starch to the fermenter as the fermentation proceeds, the starch being present at a given time in such quantity as to be converted to sugars at such rate that the yeast can assimilate the sugars without the production of substantial amounts of alcohol. In fact, under this procedure, it may be possible to reduce the fermentation period to an extremely short time, such as nine or ten hours.

When the fermentation is completed, the separation of the yeast from the mass in the fermenter may be accomplished in any usual or convenient manner.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

In using the term "soluble" as applied to starch in the following claims, it is used in its commonly accepted sense in this art, as synonymous with "liquefied starch" and meaning a starch which will form a colloidal suspension or a solution in water as differentiated from a water insoluble starch or a gelatinized starch.

I claim:

1. Process of manufacturing yeast, which comprises treating starches to render them soluble without substantial conversion to sugars, adding to at least a portion of the soluble starches other materials to form a yeast nutrient medium deficient in yeast assimilable sugar, inoculating the resulting mass with seed yeast, causing propagation of yeast by aerating the mass at a temperature of about 30° C., and adding to the said medium an enzyme adapted to convert starches to sugars in the said medium while yeast is propagating therein.

2. Process of manufacturing yeast, which comprises treating starches to render them soluble without substantial conversion to sugars, adding to at least a portion of the soluble starches other materials to form a yeast nutrient medium, inoculating the resulting mass with seed yeast, causing propagation of yeast by aerating the mass at a temperature of about 30° C., and thereafter adding to the said medium from time to time an enzyme adapted to convert starches to sugars in the said medium while yeast is propagating therein, and controlling the addition of the enzyme so that the rate of conversion of starches to sugars is about the rate at which the sugars are assimilated by the growing yeast.

3. Process of manufacturing yeast which, during the period of propagation of yeast in the fermenter, comprises converting soluble starches in the fermenter to sugars which are assimilable by the yeast being produced, by the action of an enzyme capable of converting soluble starches to such sugars, the rate of conversion of starches to sugars being controlled so that the sugars formed are practically all assimilated by the growing yeast.

4. Process of manufacturing yeast which comprises preparing a soluble starch solution by the action of an enzyme capable of liquefying and rendering hydrated starch soluble, said preparation being under conditions preventing conversion of the soluble starches into sugars, adding to the fermenter at least a portion of the soluble starch plus nitrogenous materials and salts in yeast assimilable form, stocking the fermenter with seed yeast, propagating the yeast in the fermenter and during propagation adding to the fermenter at about 30° C. a malt extract containing an enzyme capable of converting soluble starches to yeast assimilable sugars, in such quantities that the rate of conversion of starch to sugars is controlled so that the sugars formed are practically all assimilated by the growing yeast.

5. Process of manufacturing yeast which comprises preparing a soluble starch solution by the action of an enzyme capable of liquefying and rendering hydrated starch soluble, said preparation being under conditions preventing conversion of soluble starches into sugars, adding to the fermenter at least a portion of the soluble starch plus nitrogenous materials and salts in yeast assimilable form and an enzyme adapted to convert soluble starches into yeast assimilable form sugars, stocking the fermenter with seed yeast, aerating and propagating the yeast in the fermenter, and during propagation adding soluble starch solution to the fermenter in such a manner that the rate of conversion of starch to sugars is controlled so that the sugars formed are practically all assimilated by the growing yeast.

6. A process of manufacturing yeast which comprises preparing a liquefied starch substantially free from yeast assimilable sugars and free from enzymes capable of converting liquefied starch to sugar, seeding the said starch with yeast in a yeast propagating medium, propagating the yeast and adding to the said medium an enzyme capable of converting the liquefied starch to sugar simultaneously with yeast propagation, said enzyme being added in quantities such that the sugar produced in the mixture during the propagation of the yeast is substantially all assimilated by the yeast.

7. A process of manufacturing yeast which includes the step of converting starch to sugar simultaneously and in the same medium with the propagation of yeast, and at such a rate that the sugar produced is substantially all assimilated by the growing yeast.

8. The process of manufacturing yeast which includes the steps of treating starch to rupture the starch cells, and thereafter converting the treated starch to sugar simultaneously and in the same medium with the propagation of yeast, and at such a rate that substantially no excess of yeast assimilable sugars, over the amount required to propagate the yeast, is present in said medium during the yeast propagation.

9. A process of manufacturing yeast comprising treating starches to render them soluble without substantial conversion to sugars, adding at least a portion of the soluble starches to other materials to form a mixture rich in yeast nutrient ingredients but deficient in yeast assimilable sugar, inoculating said mixture with said yeast, causing propagation of yeast by aerating the seeded mixture, and adding an enzyme adapted to convert starches to sugars in said mixture while yeast is propagating therein.

10. A process of manufacturing yeast comprising the steps of preparing a yeast nutrient medium deficient in yeast assimilable sugar, and converting soluble starch to sugar by diastatic action in said medium simultaneously with the propagation of yeast therein.

11. A process of manufacturing yeast comprising the steps of preparing a yeast nutrient medium deficient in yeast assimilable sugars, seeding said medium with yeast, aerating said seeded medium to propagate yeast therein, and converting soluble starch to sugar by diastatic action in said medium simultaneously with the propagation of yeast therein.

JOHN F. WROTEN.